United States Patent [19]
Bourgeois et al.

[11] 3,752,627
[45] Aug. 14, 1973

[54] DEVICE FOR MANUFACTURING A HOLLOW ARTICLE OF PLASTIC MATERIAL

[75] Inventors: Jacques Bourgeois, Lyon; Hubert Blanchard, Le Havre, both of France

[73] Assignee: Sidel Societe Anonyme, Le Havre, France

[22] Filed: Oct. 22, 1970

[21] Appl. No.: 83,002

[30] Foreign Application Priority Data
June 18, 1969 France ............................. 6920327
Oct. 24, 1969 France ............................. 6936695

[52] U.S. Cl. .............................. 425/298, 425/310
[51] Int. Cl. ............................................ B29d 23/03
[58] Field of Search .................. 425/289, 298, 309, 425/310, 387, 326; 264/94

[56] References Cited
UNITED STATES PATENTS
3,004,285 10/1961 Hagen ................................ 425/387
3,579,621 10/1971 Mehnert ............................. 425/326

FOREIGN PATENTS OR APPLICATIONS
1,167,513 10/1969 Great Britain ..................... 264/94
397,223 2/1966 Switzerland ....................... 425/326
1,176,829 8/1964 Germany ........................... 425/326

*Primary Examiner*—J. Spencer Overholser
*Assistant Examiner*—Michael O. Sutton
*Attorney*—Robert E. Burns and Emmanuel J. Lobato

[57] ABSTRACT

The invention relates to manufacturing a hollow article of plastic material having at least one orifice, in a mould having an inner cavity. A hollow closed body of plastic material in a deformable state is first formed in the inner mould cavity. Then, compressed air is injected into the hollow closed body, while forming in the walls of said body a closed line of lesser resistance corresponding to the orifice lip of the article to be manufactured. Finally, that portion of the inner mould cavity which corresponds to the article orifice is temporarily increased in volume, whereby the wall of the hollow body is cut along the line of lesser resistance by the compressed air acting on that portion of the body wall which lies within the closed line of lesser resistance.

3 Claims, 10 Drawing Figures

Patented Aug. 14, 1973

DEVICE FOR MANUFACTURING A HOLLOW ARTICLE OF PLASTIC MATERIAL

BACKGROUND OF THE INVENTION

The present invention relates to cutting one portion of the wall of a hollow plastic article during the blow-moulding thereof in a mould.

It is known to manufacture hollow bodies such as bottles, tubes, etc., notably of thermoplastic material, by extruding a sheath of which the wall is subsequently applied against that of the inner cavity of a mould, by blowing compressed air into said sheath, the latter being of course sealed at either end beforehand.

This known method of manufacturing hollow articles by extrusion blowing is attended by the problem of cutting one or several portions of the wall of the hollow, closed article. In fact, if the end product is to constitute a bottle or like container the upper portion of the neck thereof must be cut off for clearing the filling orifice or aperture. If the finished product is to be a tube, for example, for packing a pasty substance, cream or the like, its bottom must be cut off to clear a filling orifice to be subsequently sealed through any known and suitable means. On the other hand, the hollow bodies manufactured by the extrusion-blowing method are frequently provided with useless portions resulting from manufacturing requirements; therefore, these useless portions must be removed by cutting off the corresponding portions of the wall of the hollow article. All the cases contemplated hereinabove have a common requirement: the wall portion to be removed must be cut off spotlessly; this is particularly obvious in the case of the clearing of filling orifices or apertures, since perfectly circular and burr-free cutting lines must be obtained.

Methods and devices for cutting off one portion of the wall of a hollow body or article during the extrusion-moulding thereof in a mould are already known; they are advantageous in that they eliminate the need of resorting to a subsequent trimming step carried out on a special machine. Thus, it is known to provide in a mould a cutting edge having the contour of the orifice to be obtained and adapted to form in the wall of the hollow body an incipient cutting line whereby the waste can easily be detached from the main body of the article during a subsequent step, for instance either manually upon completion of the stripping step, or mechanically, within the mould proper, for example by resorting to a shearing action obtained by causing a relative movement to take place between the aforesaid cutting edge and the other mould portion; it is also known to provide the mould with a suitable movable knife or like cutting blade. However, these various known methods and devices are ill-suited for ensuring an easy cutting ot the wall portion to be removed from the plastic hollow article, due to the moderate resistance Of the thermoplastic material constituting this article with respect to the shearing action produced by the cutting edge or other blade means implemented; consequently, the resulting cut is generally irregular, and of course, this is particularly detrimental when this cut is intended to form the lip or edge of the orifice of a bottle or like container; in this last instance, more particularly, the resulting lip is not flat, since the neck is slightly distorted by the feed movement of the cutting edge or blade.

SUMMARY OF THE INVENTION

It is the essential object of the present invention to provide a method and means for cutting off one portion of the wall of a hollow body during the blow-moulding or extrusion-blowing thereof in a mould, under perfectly satisfactory conditions, i.e., by obtaining a clean, burr-free cutting line; this invention is adapted notably to form, on the filling orifice or aperture of a bottle or like container manufactured according to the extrusion-blowing process, a perfectly regular and flat lip, even if the wall to be cut is extremely thin.

The method according to the invention for cutting off one portion of the wall of a hollow body during the extrusion-blowing thereof in a mould is characterized in that the inner cavity or moulding cavity of the mould is provided, along the cutting line contemplated, with a cutting edge projecting within said cavity, and that a temporary volume increment is produced in the zone of said inner cavity which corresponds to the wall portion to be removed, whereby the inner blowing pressure will cause the wall of said hollow body to be cut by said cutting edge and thus separate the cut wall portion from the body.

The present invention is also concerned with a device for cutting off one portion of the wall of a hollow body during the blowing thereof in a mould; this device is characterized in that the wall of the inner cavity of the mould, in at least one portion of the zone corresponding to the portion to be cut off, consists of wall elements of one or a plurality of members movable outwards from said cavity, and that means are provided for causing the movement of said movable member or members between two predetermined positions whereat the total volume of the inner cavity of the mould has two considerably different values.

Experience teaches that the method and device of this invention permit of obtaining perfectly clean and regular, burr-free cutting lines or edges, and that, when applied to the cutting of the filling orifice of a bottle or like container manufactured by the extrusion-blowing process, they produce a perfectly regular and flat lip around this orifice.

BRIEF DESCRIPTION OF THE DRAWING

Several forms of embodiment of the present invention will now be described by way of example with reference to the attached drawings, in which.

DESCRIPTION OF THE PREFERRED EMBODIMENT

Figure 1:
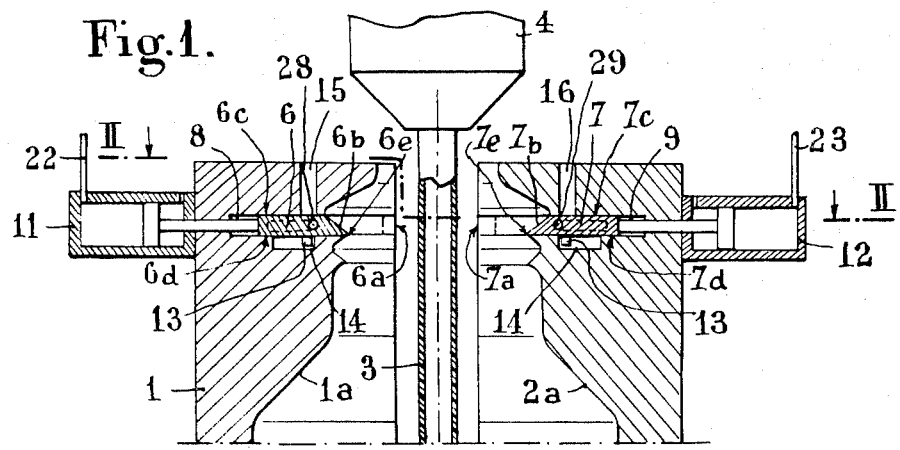
FIG. 1 is a vertical section showing the upper portion of a mould equipped with a first form of embodiment of the device of this invention, the mould being shown in its open condition.
Figure 2:
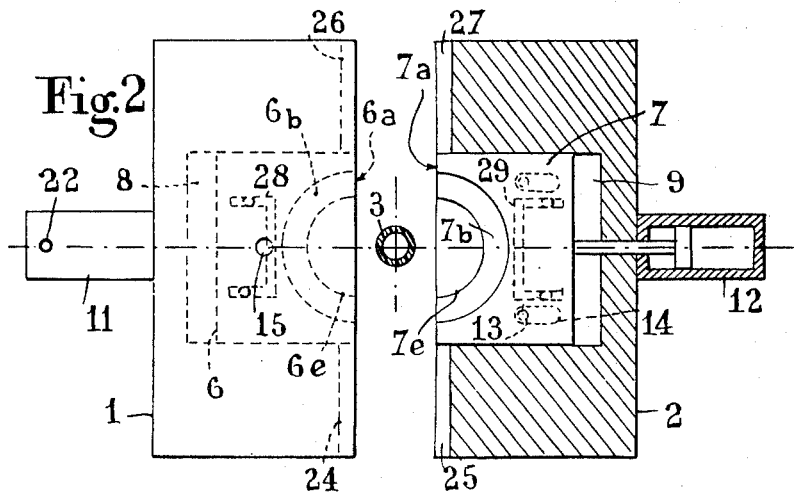
FIG. 2 is a horizontal section taken along the line II—II of FIG. 1.
Figure 3:
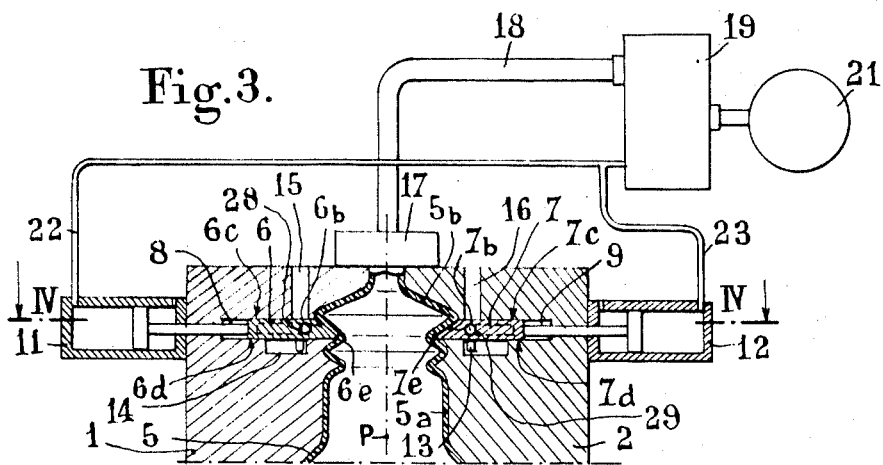
FIG. 3 is a fragmentary vertical section similar to the section of FIG. 1, but showing the mould closed at the beginning of the hollow body blowing operation.

Referring first to FIGS. 1 and 2, the mould illustrated therein is of the open type comprising two halves 1 and 2 disposed symmetrically on either side of their joint plane. This mould is used for manufacturing hollow bodies of thermoplastic material, notably bottles or like containers, obtained from a tubular parison 3 produced by an extruder 4. As wall known in the art, one section of the tubular parison 3 is clamped between the/two mould halves 1 and 2, and when the mould is closed (FIG. 3) compressed air is introduced into the parison section so that the latter still in the plastic state undergoes a deformation and is pressed with force against the mould impressions 1a and 2a. Thus, a hollow body 5 (FIG. 3) is obtained; this body 5 comprises, above the neck 5a, a waste 5b to be removed for obtaining a finished article. In FIG. 3 the hollow body 3 is shown as it appears within the mould during the blowing operation.

The trimming device provided for separating the waste or "plug" 5b from the neck portion 5a of the blown hollow body comprises essentially a pair of supporting plates 6 and 7, of substantially parallelipipedic configuration, slidably mounted in substantially prismatic transverse recesses 8 and 9, respectively. These plates are advantageously formed with ducts 28 and 29 connected to orifices for supplying cold water to the mould and exhausting warm water therefrom, respectively, so that these plates are water-cooled by internal circulation. These recesses 8, 9 extend at right angles to the joint plane P of the mould halves and therefore to the axis of the extruded parison section 3. The plates 6 and 7 are formed with front edges 6a, 7a respectively engaging each other in the joint plane P when the mould is closed and the cutting device is inoperative (FIG. 3). The front edges 6a and 7a of plates 6 and 7 are formed with semi-circular notches 6b and 7b adapted, when the plates 6 and 7 are assembled, to form a circular aperture through which the extruded parison section 3 is engaged. The semi-circular notches 6b and 7b have tapered edges forming a frustoconical surface outflaring upwards and outwards; this surface merges into the upper faces 6c and 7c and into the lower faces 6d and 7d respectively of plates 6 and 7, so as to form therewith corresponding semi-circular edges 6e and 7e.

When the trimming device is in its inoperative position and the mould is closed, the frustoconical surfaces 6b and 7b form a continuous surface merging into the inner impressions 1a and 2a of the two mould halves, the minor base of the frustoconical surface consisting of the abutting edges 6e and 7e.

The sliding plates 6 and 7 are rigidly connected to the piston rods of a pair of opposed pneumatic cylinder-and-piston actuators 11 and 12 having their axes perpendicular to the joint plane P; These actuators 11 and 12 are carried by the mould halves 1 and 2, respectively, and control the sliding movement of said plates 6 and 7 perpendicularly to the plane P.

Figure 4:
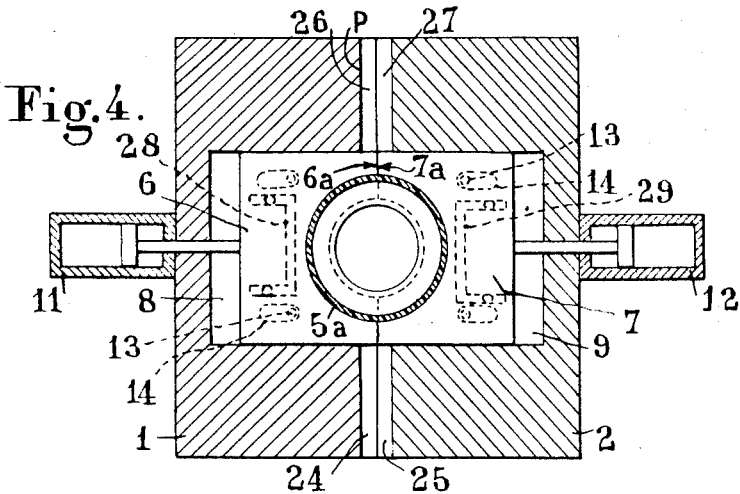
FIG. 4 is a horizontal section taken along the line IV—IV of FIG. 3.

During the blowing operation, the members 6 and 7 are kept in mutual abutting contact in the limit positions shown in FIGS. 3 and 4, by using any suitable and known means. Thus, for instance, plates 6 and 7 may carry studs 13 adapted to slide in grooves 14 formed in the lower surfaces of the prismatic recesses 8 and 9, and to abut against the ends of these grooves 14.

Venting ducts 15 and 16 leading to the free atmosphere are formed between one face of each mould half, for instance the upper face, and one of the faces of the prismatic recesses 8 and 9 which are slidably engaged by the plates 6 and 7, respectively, for instance the upper faces of these recesses. In the inoperative position, that is, during the blowing step, the plates 6 and 7 close the orifices of ducts 15 and 16 as clearly shown in FIGS. 3 and 4.

Figure 6:
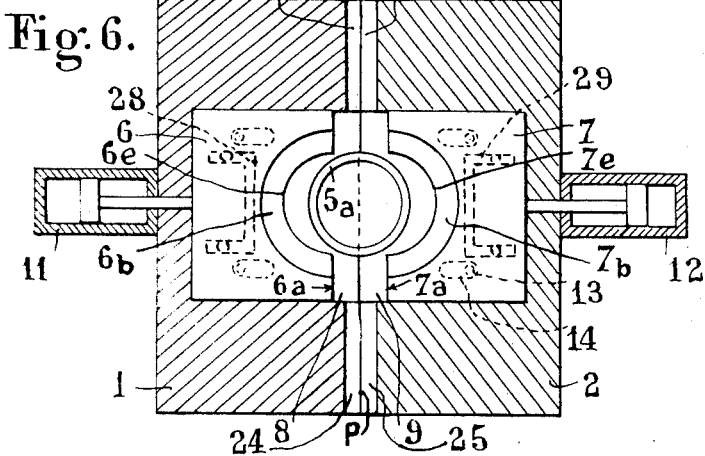
FIG. 6 is a horizontal section taken along the line VI—VI of FIG. 5.

The mould may further comprise clearances 24,25 on one side and 26,27 on the other side, these clearances are formed parallel to the joint plane P (FIGS. 2, 4 and 6) in the joint plane surfaces of the two mould halves 1 and 2. These clearances open on the one hand externally of the mould and, on the other hand, into the recesses 8, 9 of plates 6, 7, and these plates are adapted in the inoperative position to close the inner ends of these clearances.

Now, the operation of the trimming device of this invention will be described in detail.

Figure 5:
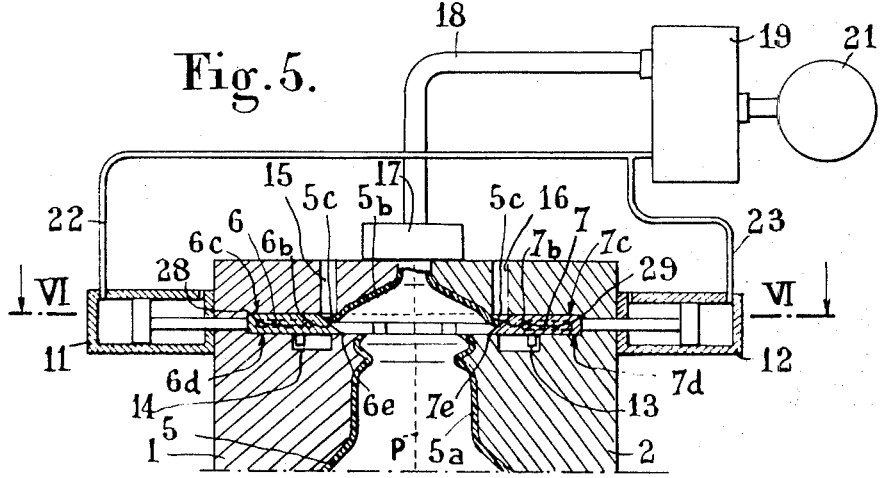
FIG. 5 is a fragmentary vertical section similar to FIG. 3 showing the mould condition shortly before the completion of the blowing operation.

The open mould in the condition illustrated in FIGS. 1 and 2 is closed to clamp therein a section of extruded parison 3 produced by the extruder 4. Then, the supporting plates 6 and 7 are in their inoperative position with the semi-frustoconical surfaces 6b and 7b merging into the impressions 1a and 2a of mould halves 1 and 2, respectively. The supporting plates 6 and 7 are pressed against teach other by the aforesaid pneumatic actuators 11 and 12 adapted to be fed with compressed air for example, as illustrated diagrammatically in FIG. 5. This FIG. 5 also shows a blowing head 17 connnected via a pipe line 18 and a programmer 19 to a suitable source 21 of compressed air. The programmer 19 is also adapted to supply compressed air to the pneumatic actuators 11 and 12 through pipe lines 22 and 23 opening into the bottom of these actuators. In this case, the actuators 11 and 12 are fed with compressed air shortly before the beginning of the blowing operation and remain under pressure during this operation.

According to a modified form of embodiment, the pipe lines 22 and 23 may be connected to the blowing pipe line 18 so that the actuators 11 and 12 are supplied with compressed air at the beginning of the blowing operation.

Thus, when closing the mould, its inner shape is identical with that of a conventional mould and the blowing operation takes place according to the conventional process. Compressed air is introduced via pipe line 18 and blowing member 17 into the section of extruded parison clamped in the mould. The sliding supporting plates 6 and 7 withstand the forces created by the internal pressure of the blown hollow body, and these forces then tend to move the plates 6 and 7 away from each other, due to the proper dimensioning of actuators 11 and 12. If these cylinder-and-piston actuators 11 and 12 are fed under the same pressure as the gas pressure utilized for inflating or expanding the hollow body, which constitutes an appreciable simplification, the surface area of the pistons of these actuators must be at least equal to the area corresponding to the projection of the semi-frustoconical surface 6b or 7b against the joint plane P of the mould.

At the end of the blowing operation, the efforts tending to keep the supporting plates 6 and 7 in their assembled position are removed. This consists in expanding the air pressure prevailing in pipe lines 22 and 23, whether these are fed separately from the blowing pipe line 18 or connected thereto. Whatever the mode of supplying compressed air to these actuators, their pressures cancel each other while the pressure within the hollow body is still considerable if the volume of this hollow body is relatively large and if the blowing orifice constituting as a rule the pressure reducing orifice of the hollow body is relatively small. Under these conditions, the supporting plates 6 and 7 are forced back as well as the portion 5c of waste 5b which is pressed against the semi-frustoconical surfaces 6b and 7b as a consequence of the internal pressure prevailing in the hollow body and as a simultaneous result the waste 5b is separated in the transverse plane bound by the lower surface 6d and 7d of plates 6 and 7.

The semi-circular edges 6e and 7e formed at the intersection of the semi-frustoconical surfaces 6b and 7b on the one hand, and the lower surfaces 6d and 7d of supporting plates 6 and 7, on the other hand, constitute knife-edges which, during the blowing operation produce weaker lines in the blown material.

After the supporting plates 6 and 7 have been driven back by the portion 5c of waste 5b as a consequence of this internal pressure, they uncover the ports of ducts 15 and 16 as well as their clearances 24 to 27, so as to connect the inner space of said hollow body with the atmosphere and produce a very sudden pressure drop in the hollow body and an instantaneous tearing off of said waste 5b.

In case the pressure drop in actuators 11 and 12 were inadequate to produce a sufficiently rapid withdrawal of supporting plates 6 and 7, it would only be necessary to either supply compressed air in the proper direction to actuators 11 and 12 (in this case of the double-acting type), by using known means, or use single-acting actuators comprising return spring means.

Once the waste 5c has been detached from the neck 5a of the hollow body as explained in the foregoing, the waste is removed when opening the mould and can be discharged and disposed through any suitable and known means.

Of course, the bottleneck configuration illustrated by way of example in the drawings should not be construed as limiting the invention, since the method and device of this invention are applicable to any other neck shapes, notably necks having in cross-section any curved or even polygonal contour, provided that the edges of the bearing surfaces such as 6b and 7b of supporting plates 6 and 7 provide zones of reduced resistance or strength in the blown plastic material.

Figure 7:
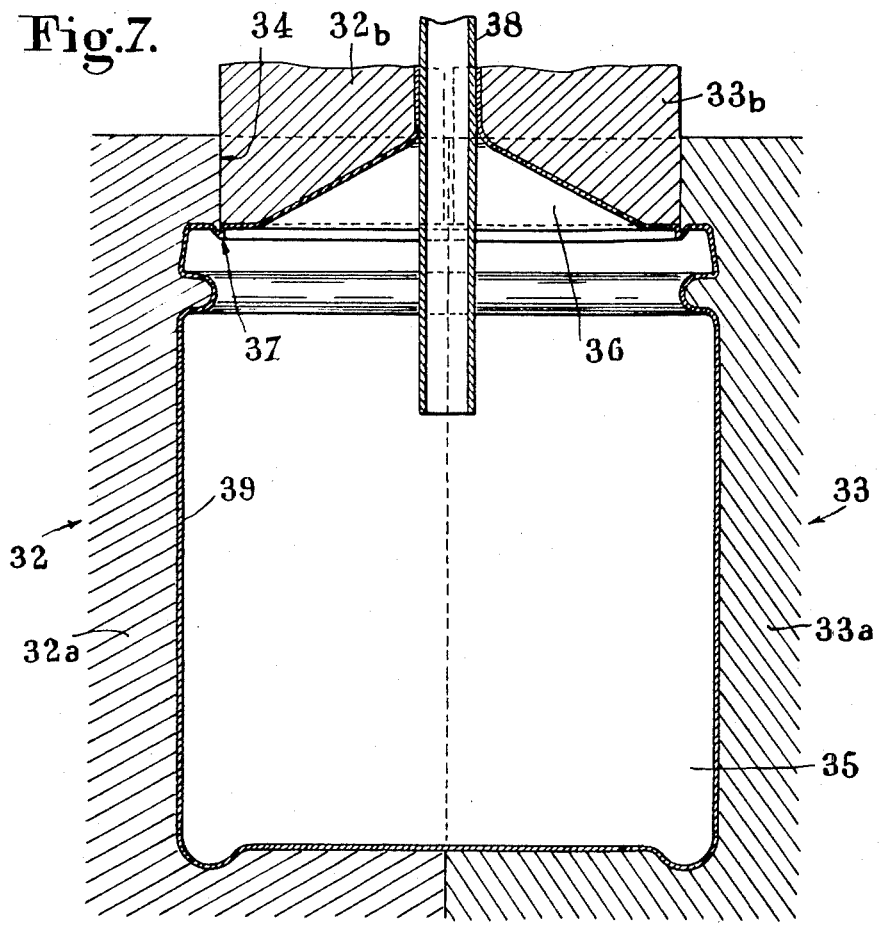
FIG. 7 is a vertical section showing a mould equipped with a modified form of embodiment of the device of this invention, which is applicable to the cutting of an in-turned lip.
Figure 8:
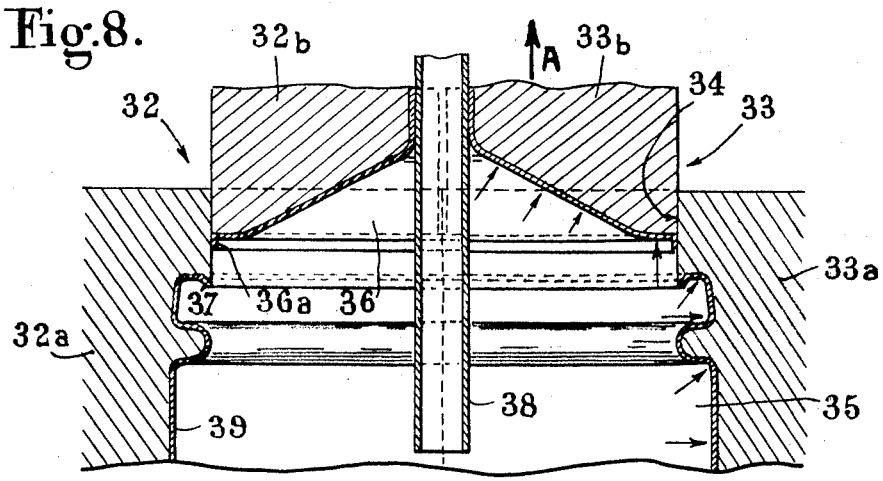
FIG. 8 is a view similar to FIG. 7 but showing the cutting of the orifice to be provided with an inturned lip.

FIGS. 7 and 8 illustrate in section two half moulds 32 and 33 constituting the blowing mould proper. Each half mould 32, 33 comprises in turn two telescopically interconnected members as shown at 32a,32b and 33a, 33b, respectively.

The lower members, or members of greater diameter 32a and 33a are fixed in the axial direction and comprise the impression of the object to be blown, such as for example a bottle or like container.

The upper members, or portions of smaller diameter, 32b and 33b of the mould are axially movable in relation to the lower fixed members; in other words, they are adapted to slide in a bore 34 formed in the upper portion of these lower members and the diameter of this bore is equal to that of the orifice to be formed in the blown body 35.

These upper members 32b and 33b are adapted to receive against their inner wall the excess of plastic material left at the end of the blowing operation, this excess amount constituting the waste 36. The lower edge of bore 34 has an extension in the form of a sharp edge 37 constituting the limit of the separation between the fixed lower members 32a and 33a and the movable upper members 32b and 33b.

Moreover, the centre of the movable upper members comprises an orifice permitting the passage of a blow pipe 38 of which the lower outlet end opens into the inner space of the mould, as shown.

The waste and the orifice of the thermoplastic bottle or like container are cut as follows:

In a manner well known per se, the previously open mould is reclosed on the parison of hot plastic material which is pressed immediately against the inner wall of the mould cavity by directing compressed air into the mould through the blow pipe 38.

Thus, according to this invention, during the pressure increment within the mould the film 39 of plastic material is pressed against the cutting edge 37 and as a result the plastic material is weakened on contacting this edge.

Then, the upper members 32b and 33b are moved in relation to the other mould parts in the direction of the arrow A (FIG. 8) while maintaining the pneumatic pressure within the mould. Thus, the plastic material is cut cleanly and accurately on the cutting edge 37 at the previously weakened points. This cutting action is due to the fact that the air under pressure contained in the blown object acts as a clamp, by pressing the portion 36 of the moulded plastic film against the movable members 32b and 33b of the mould, so that this portion 36 receives the efforts producing the desired cutting at the weakened points.

Then, the mould is opened and the bottle or other moulded object is stripped therefrom.

Figure 9:
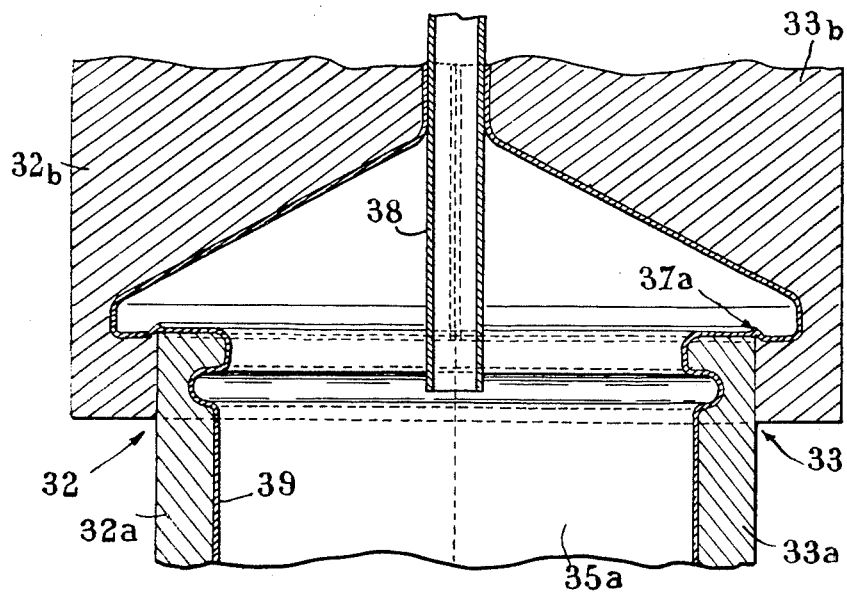
FIGS. 9 and 10 illustrate the various steps of the operation of an arrangement constituting a modified form of embodiment in relation to FIGS. 7 and 8, applicable to the cutting of an orifice to be provided with an outturned lip.
Figure 10:
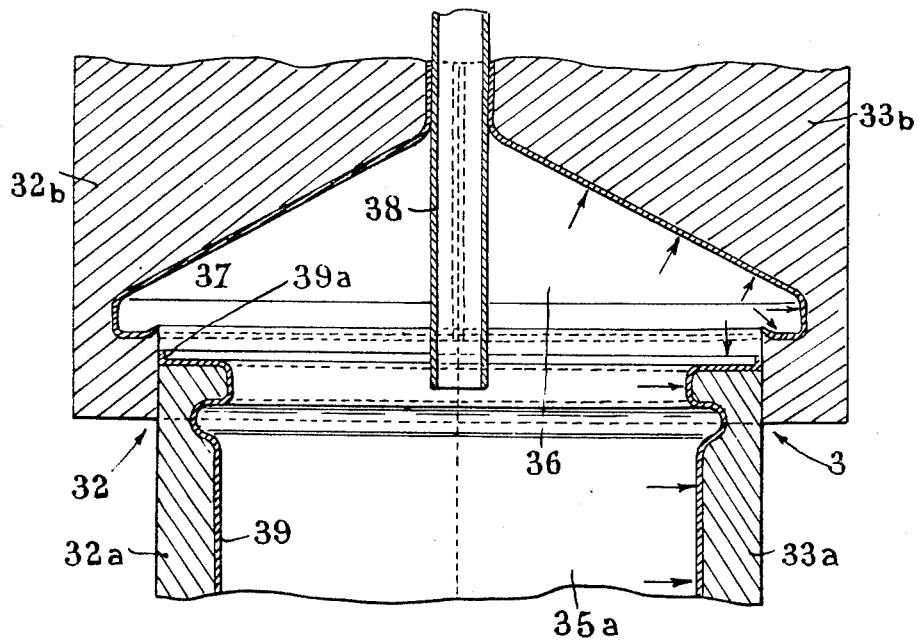

FIGS. 9 and 10 show the application of this method to the manufacture of a bottle 35a having its fitting orifice provided with a radial peripheral lip with out-turned edge.

In this case, the mould comprises two telescopically assembled members 32a, 32b and 33a, 33b, the lower members 32a, 33a having a smaller diameter at the level of the bottle aperture and comprising the cavity for moulding the blown body; furthermore, it is axially fixed. The upper members 32b, 33b of greater diameter at the aforesaid level is axially movable and comprises the impression corresponding to the waste, and also along its edge corresponding to the bottle orifice a cutting edge 37a projecting within the mould parallel to the axis of said orifice.

As will be readily understood from FIGS. 7 and 9, the mould portion lying within the cutting edge 37a is slightly recessed in relation to the plane defined by said edge, so as to provide after the cutting operation a plastic lip constituting a kind of cylindrical skirt having the cross-sectional dimension and shape of the orifice, or the like, this lip overlapping the contact surface between the fixed and movable mould members, during the movement required for cutting the waste, and acts therefore as a sealing gasket until the mould opening step begins.

In FIGS. 7 and 8, this lip is designated by the reference numeral 36a and in the example of FIGS. 9 and 10 by the reference numeral 39a.

Of course, and as already clearly apparent from the foregoing, this invention should not be construed as limiting its field of application to the single examples given herein, since all possible modifications and variations would fall within the meaning and range of equivalence of the invention.

What we claim is:

1. In a device for manufacturing a hollow article of plastic material having at least one orifice, comprising a mould having an inner cavity formed with a wall provided with a cutting edge projecting within said inner cavity and extending along a closed line corresponding to the orifice lip of the article to be manufactured, said mould comprising at least one fixed member and at least one member slidably engaged in said fixed member, to be movable between first and second positions wherein respectively the volume of said inner cavity has a first and a second value, said second value being substantially higher than said first value, said movable member forming as well in said second position as in said first position thereof at least one portion of the wall of the inner cavity of said mould in the zone thereof corresponding to the orifice of the article to be manufactured, whereby said mould inner cavity is closed in both positions of said movable member, means for forming in said inner cavity of the mould a hollow, closed body with relatively thin walls, consisting of plastic material in a deformable state, means for injecting compressed air during a predetermined time into said hollow, closed body, and other means for holding said movable member in its first position only during a first fraction of the predetermined time of compressed air injection into said hollow body, the improvement wherein said fixed and movable members are arranged as a punch and die assembly and adapted to slide axially into each other, one member being provided with the cutting edge projecting into the inner cavity of the mould, as an extension of that surface of said one member which is slidably engaged by the other member.

2. Device as set forth in claim 1, for manufacturing an article having an in-turned orifice lip, wherein said mould consists of a pair of half-moulds each comprising two telescopic members of different diameters, the telescopic member of greater diameter, which comprises an impression of the article to be manufactured, being axially fixed and carrying, on its edge corresponding to the orifice lip of said article, the cutting edge projecting into said mould cavity, parallel to the axis of the article orifice, the other telescopic member of smaller diameter, which comprises an impression corresponding to the article orifice being mounted for sliding movement parallel to the axis of said orifice between predetermined first and second positions.

3. Device as set forth in claim 1, for manufacturing an article having an out-turned orifice lip, wherein said mould consists of a pair of half-moulds, each comprising two telescopic members of different diameters, the telescopic member of smaller diameter at the level of the orifice of the article to be manufactured which comprises an impression of said article, being axially fixed, the other telescopic member of greater diameter at said level, which comprises an impression corresponding to the article orifice, being axially movable and comprising along its edge corresponding to the orifice lip the cutting edge projecting within the mould parallel to the axis of said orifice.

* * * * *